United States Patent [19]

Avant

[11] 4,282,710
[45] Aug. 11, 1981

[54] CONTROL SYSTEM AND METHOD FOR A PRESSURE RESPONSIVE FUEL REGULATOR

[75] Inventor: William W. Avant, Paradise Valley, Ariz.

[73] Assignee: The Garrett Corporation, Los Angeles, Calif.

[21] Appl. No.: 15,252

[22] Filed: Feb. 26, 1979

[51] Int. Cl.³ .............................................. F02C 9/04
[52] U.S. Cl. ............................................. 60/39.28 R
[58] Field of Search .......................... 60/39.28 R, 243

[56] References Cited

U.S. PATENT DOCUMENTS

| | | |
|---|---|---|
| 2,996,878 | 8/1961 | Leeper .................................. 60/243 |
| 3,002,350 | 10/1961 | Longstreet . |
| 3,008,515 | 11/1961 | Wente .................................... 60/243 |
| 3,021,670 | 2/1962 | Boler et al. . |
| 3,026,673 | 3/1962 | Ollodort . |
| 3,032,986 | 5/1962 | Wright . |
| 3,037,350 | 6/1962 | Cowles et al. . |
| 3,129,563 | 4/1964 | Long . |
| 3,156,291 | 11/1964 | Cornell . |
| 3,198,008 | 8/1965 | Sclafani . |
| 3,205,655 | 9/1965 | Wright . |
| 3,530,666 | 9/1970 | Cross et al. . |
| 3,564,844 | 2/1971 | Rimmer . |
| 3,733,825 | 5/1973 | Arnett . |
| 3,813,063 | 5/1974 | Martin . |
| 3,938,322 | 2/1976. | Turner . |

Primary Examiner—Robert E. Garrett
Attorney, Agent, or Firm—Stuart O. Lowry; James W. McFarland; Albert J. Miller

[57] ABSTRACT

A system and method for selectively and controllably supplying a preselected pressure source for controlling a pressure-responsive fuel flow metering system, the system being especially capable for use as a Mach number hold unit for controlling fuel flow to aircraft jet engines.

35 Claims, 3 Drawing Figures

CONTROL SYSTEM AND METHOD FOR A PRESSURE RESPONSIVE FUEL REGULATOR

BACKGROUND OF THE INVENTION

This invention relates to a control system for controlling the operation of a pressure-responsive fuel flow metering system. More specifically, this invention relates to a fuel flow metering control system capable for use as a Mach number hold unit for controlling fuel flow to jet engines used in aircraft.

Fuel flow devices and systems are widely available for governing fuel flow to jet engines used on aircraft. These fuel control devices normally are designed for controlling fuel flow under a specific set of operating conditions, such as either subsonic flight or supersonic flight, and in response to predetermined pressures or pressure ratios. For example, fuel control systems have been designed responsive to ram air pressure, such as those shown and described in U.S. Pat. Nos. 3,002,350; 3,026,673; 3,037,350; and 3,198,008. Other fuel control systems have been designed responsive to other flight pressures or parameters, such as ambient air pressure, engine inlet temperature, or other parameters which may be mechanically derived as by bellows and/or diaphragm arrangements, or by electronic computation elements. See, for example, U.S. Pat. Nos. 3,032,986; 3,156,291; 3,205,655; 3,530,666; 3,733,825; 3,813,063; and 3,938,322.

A major design problem in modern jet aircraft engines arises in providing highly accurate and consistent fuel metering control at high speed and high altitude cruise conditions, while at the same time providing satisfactory control at low speed and low altitude operation. A fuel metering control for closely holding aircraft speed at a constant absolute speed during high speed, high altitude cruise is desired for maximum fuel economy and passenger comfort. That is, particularly with modern wide body aircraft powered by relatively high bypass ratio fan-type engines, fuel flow is preferably held constant for smooth and efficient operation at absolute speeds on the order of about 0.80 Mach. However, fuel control systems designed for high speed, high altitude operation typically do not function satisfactorily at low speed and low altitude operation.

In the prior art, so-called Mach number hold units have been designed for controlling fuel flow at a relatively constant level during high altitude, high speed cruise conditions. These units of the prior art have basically comprised relatively conventional fuel flow metering control systems designed for operation under these specific cruise conditions, and have unfortunately included certain inherent limitations resulting in fuel flow inaccuracies and instabilities. For example, some of these systems comprise high gain systems responsive to ram air pressure, such as those systems shown in U.S. Pat. No. 3,021,670. However, while ram air pressure may be satisfactorily used at low speed and low altitude, fluctuations in ram air pressure tend to result in a gradual increase or creep of the fuel flow under high altitude conditions. Accordingly, to prevent this "creep", the flow control system must be adjusted manually, or by means of a relatively complex automatic pilot system. Other fuel flow control systems have attempted to provide alternate pressure-responsive systems for obtaining control pressures by means of restrictors or sonic nozzles, but these schemes too have failed to meet the high accuracy requirements of a Mach number hold unit. See, for example, U.S. Pat. Nos. 3,129,563 and 3,564,844.

The present invention overcomes the problems and disadvantages of the prior art by providing a fuel flow metering control system for use as a Mach number hold unit in jet aircraft engines wherein the system is responsive to a control pressure comprising a predetermined function of absolute ambient air pressure, as well as for use at low speed and altitude conditions wherein the system is responsive to ram air pressure.

SUMMARY OF THE INVENTION

In accordance with the invention, a fuel flow metering control system comprises a pneumatic switcher for controlling the coupling of a predetermined control pressure or ram air pressure to a fuel flow metering control line. The switcher operably positions a switching valve between one position for coupling of ram air pressure to the control line for normal engine operation, and another position for coupling the predetermined control pressure to the control line for high altitude, high speed cruise operation.

The pneumatic switcher is pressure-operated by a pressure source such as a discharge pressure from one stage of the jet engine compressor. This pressure is supplied at high speed and altitude cruise conditions to a pressure ratio servo through a modulating control valve, the position of which is governed by a double-ended servo balance beam. One end of the servo beam is coupled to diaphragm means responsive to ambient air pressure, and the other end of the beam is coupled to evacuated bellows means. The servo beam responds to the diaphragm means and bellows means to modulate the control valve to provide a servo output pressure comprising a precalculated function of absolute ambient air pressure which is independent of ram air pressure and other system variables. This constant servo output control pressure is supplied to the fuel flow metering control line for controlling fuel flow during high speed and altitude cruise operation.

In one preferred embodiment of the invention, a manually actuated solenoid is operable to control the pneumatic switcher, and thereby control the position of the switching valve. In another preferred embodiment of the invention, a fluidics comparator circuit operably compares ram air pressure with the precalculated servo output pressure from the pressure ratio servo, and operates the pneumatic switcher and switching valve automatically to couple the fuel flow metering control line to the lesser of the two pressures.

BRIEF DESCRIPTION OF THE DRAWINGS

The accompanying drawings illustrate the invention. In such drawings.

DETAILED DESCRIPTION OF THE PREFERRED EMBODIMENT

Figure 1:
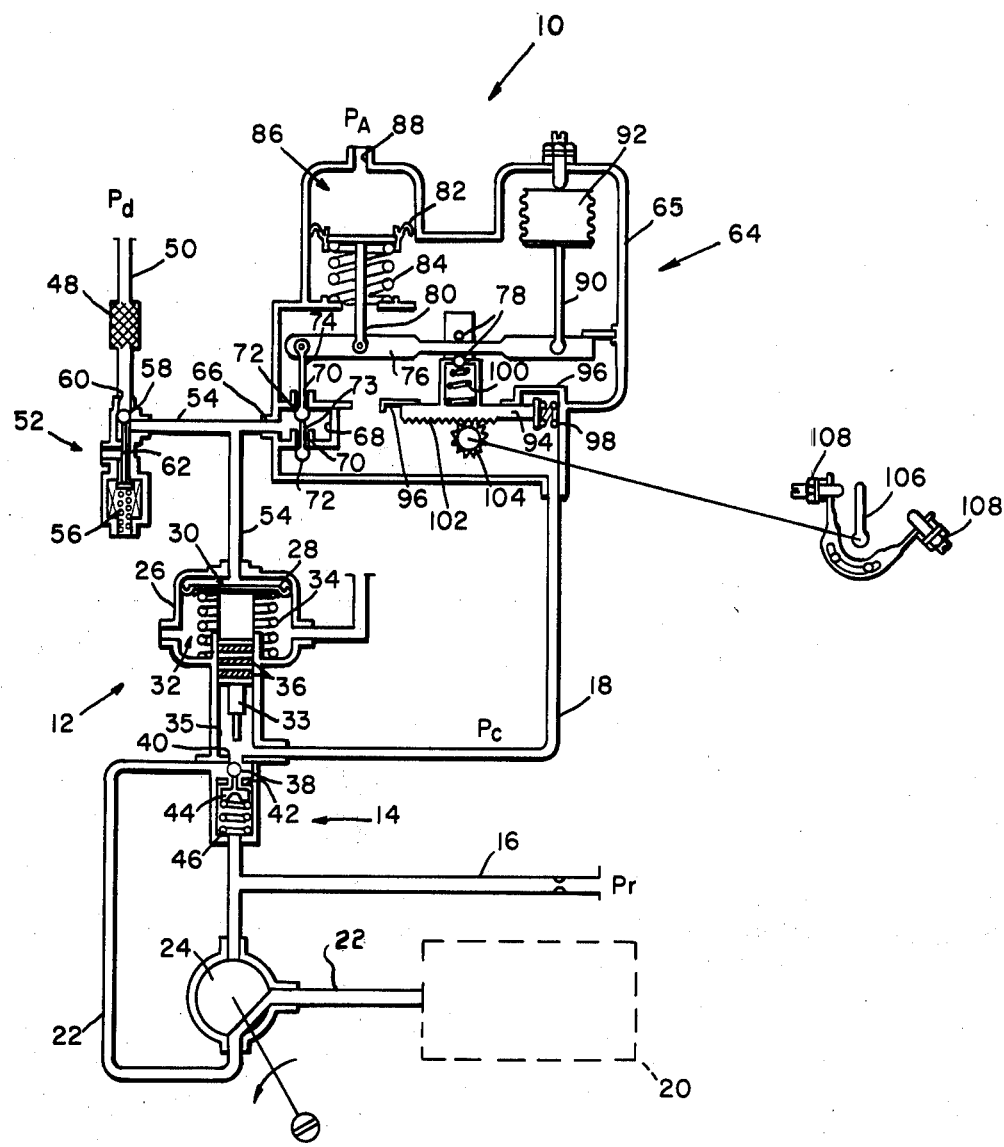
FIG. 1 comprises a schematic illustration of one embodiment of the invention.

A fuel flow metering control system 10 is shown in FIG. 1, and generally comprises a pneumatic switcher 12 for controlling the position of a switching valve 14. The switching valve 14 communicates with ram air pressure ($P_r$) via a conduit 16, and with a predetermined control pressure ($P_c$) via a conduit 18. In operation, the position of the switching valve 14 is determined by operation of the pneumatic switcher 12 to couple either ram air pressure ($P_r$) or the predetermined control pressure ($P_c$) to a conventional pressure-responsive engine fuel flow metering regulator 20 as by a control conduit or line 22. Conveniently, a manually operated deactivation switch 24 is provided in the control line 22 for emergency or manual shut-off of the system 10 to allow control of the regulator 20 solely in response to ram air pressure directly via the conduit 16.

The fuel flow metering control system 10 of this invention is designed for use in controlling fuel flow to jet engines of the type used in modern jet aircraft, and in particular for controlling fuel flow to high bypass ratio fan-type engines used on modern wide body aircraft. More specifically, the control system 10 of this invention is operable to control fuel flow in response to ram air pressure at low speed and/or low altitude operating conditions. However, at high speed and high altitude cruise conditions, the invention is operable to control fuel flow in response to a control pressure comprising a constant and predetermined precalculated function of absolute ambient air pressure. In this manner, fuel flow creep or fluctuations resulting from varying or unstable system parameters at these specific cruise conditions are avoided.

With reference to FIG. 1, the pneumatic switcher 12 comprises a hollow housing 26 with an internal flexible diaphragm 28 separating the housing interior into an upper chamber 30 and a lower chamber 32. The diaphragm is controllably biased upwardly by a spring 34 to control the position of a valve plunger 33. This plunger 33 is coupled to and movable with the diaphragm 28, and extends downwardly through the lower chamber 32 and an opening 35 in the housing 26 toward the switching valve 14. Conveniently, passage of the plunger 33 through the opening 35 is sealed as by a plurality of seal rings 36 or the like.

The switching valve 14 comprises a valve ball 38 movable between an upper valve seat 40 and a lower valve seat 42. As shown, the valve ball 38 rests upon a valve guide 44 which is biased upwardly by a spring 46 to urge the ball 38 into a normally closed position in engagement with the upper valve seat 40. In this position, ram air pressure ($P_r$) is coupled through the switching valve 14 to the fuel flow control line 22 whereby the regulator 20 is controlled in response to ram air pressure. However, upon activation of the pneumatic switcher 12 as will be described, the plunger 33 shifts downwardly to engage the valve ball 38 and to move the ball to a retracted position against the lower valve seat 42. In this retracted position, ram air pressure flow to the control line 22 is shut off, and the control line 22 is opened to communicate with the predetermined control pressure ($P_c$) via the conduit 18.

The pneumatic switcher 12 is controlled in response to pressure from a convenient source, such as a compressor discharge pressure ($P_d$) taken from one of the compressor stages of the jet engine. This compressor discharge pressure ($P_d$) is coupled to the pneumatic switcher 12 through a filter 48 in a line 50, a solenoid valve 52, and a conduit 54. The solenoid valve 52 comprises an electrically operated solenoid member 56 which controls the position of a valve ball 58 between an upper valve seat 60 and a lower valve seat 62. In the normal de-energized condition, the solenoid member 56 positions the ball 58 against the upper seat 60 to close off communication between the conduits 50 and 54. In this condition, the pneumatic switcher spring 34 withdraws the valve plunger 33 from the switching valve ball 38 to couple ram air pressure to the fuel flow regulator 20. However, when the solenoid member 56 is energized such as at high speed and high altitude cruise conditions, the solenoid member 56 moves the ball 58 to the lower seat 62. This couples the compressor discharge pressure ($P_d$) to the upper chamber 30 of the pneumatic switcher 12. In the event the discharge pressure ($P_d$) exceeds a threshold value governed by the characteristics of the spring 34, the pressure ($P_d$) overcomes the bias of the spring 34 to result in downward movement of the plunger 33 to shift the position of the valve ball 38 and couple the control pressure ($P_c$) to the regulator 20.

The control pressure ($P_c$) is derived from a pressure calculation device comprising a pressure ratio servo 64. The pressure ratio servo 64 is responsive to the compressor discharge pressure ($P_d$) via the conduit 54 when the solenoid member 56 is energized. In operation, the servo 64 alters the discharge pressure ($P_d$) in accordance with absolute ambient air pressure to compute the predetermined control pressure ($P_c$) comprising a known and predetermined function of absolute ambient air pressure. This control pressure ($P_c$) is supplied to the line 18 for coupling through the switching valve 14 and control line 22 to the fuel flow regulator 20.

As shown in FIG. 1, the pressure ratio servo 64 comprises a housing 65 which receives the compressor discharge pressure ($P_d$) from the conduit 54 through an inlet port 66. This inlet port 66 opens into a modulation chamber 68 having a pair of valve seats 70 operatively associated with a corresponding pair of modulating valve balls 72 mechanically linked by an arm 73. Importantly, as shown, one of the valve balls 72 is positioned to be urged away from its seat 70 by the incoming pressure ($P_d$), and the other valve ball 72 is positioned to be urged toward its seat 70.

The mechanically linked valve balls 72 are pivotally connected by an extension 74 of the arm 73 to one end of a double-ended servo balance beam 76 within the servo housing 65. This double-ended balance beam 76 is centrally pivoted with respect to movable pivot pins 78 whereby movement of the beam 76 to allow entry of compressor discharge pressure ($P_d$) into the servo housing 65 is controlled by relative moments applied to opposite ends of the beam. More specifically, a mechanical link 80 is pivotally connected to the beam 76 on the same side of the pins 78 as the valve balls 72. This link 80 extends upwardly for connection to a flexible diaphragm 82 biased upwardly by a spring 84. The upper surface of the diaphragm 82 communicates with a chamber 86 to which ambient air pressure ($P_a$) is supplied through a port 88. In this manner, ambient pressure ($P_a$) overcoming the spring 84 pivots the one side of the beam 76 downwardly to shift the valve balls 72 away from their seats 70 and allow entry of the compressor pressure ($P_d$) into the housing 65.

The opposite end of the balance beam 76 is coupled by a pivotal link 90 to an evacuated spring-bellows 92. In operation of the servo, the spring-bellows 92 functions to adjust the position of the beam 76 in accordance with absolute pressure. That is, as the compressor pressure ($P_d$) enters and pressurizes the servo housing 65, the one end of the beam 76 is urged downwardly by the ambient pressure ($P_a$) and the other end is urged downwardly by a ratio of incoming compressor pressure ($P_d$)

adjusted to absolute. Importantly, the relative force moments applied to the balance beam 76 are carefully selected and controlled to modulate the position of the valve balls 72 and thereby also modulate the pressure within the servo housing 65 to an absolute pressure comprising a predetermined function of ambient pressure. This calculated pressure comprises the control pressure ($P_c$), and is supplied to the switching valve 14 via the conduit or line 18.

An adjustment rack 94 is conveniently provided for allowing adjustment of the pivot pins 78 along the length of the balance beam 76, and thereby allowing variation or control of the force moments applied to the beam. This is particularly advantageous in that it allows the control pressure ($P_c$) to be adjusted to optimum value for a given engine and aircraft. As shown, the rack 94 is carried within the servo housing 65 in horizontal sliding relation with wall members 96. If desired, a spring 98 may be provided to urge the rack 94 toward one horizontal limit. The rack 94 carries the pivot pins 78 which may be retained in bearing engagement with the beam 76 as by a retention spring 100. Importantly, the lower face of the rack 94 includes gear teeth 102 meshing with a control gear 104. The control gear 104 may be rotated about its axis by means of a pilot-controlled lever 106 which may be suitably adjusted between limit stops 108. As can be seen from the FIG. 1, adjustment of the lever 106 horizontally shifts the rack 94 to alter the force moments applied to the balance beam 76, and thereby alter the value of the control pressure ($P_c$).

Figure 2:
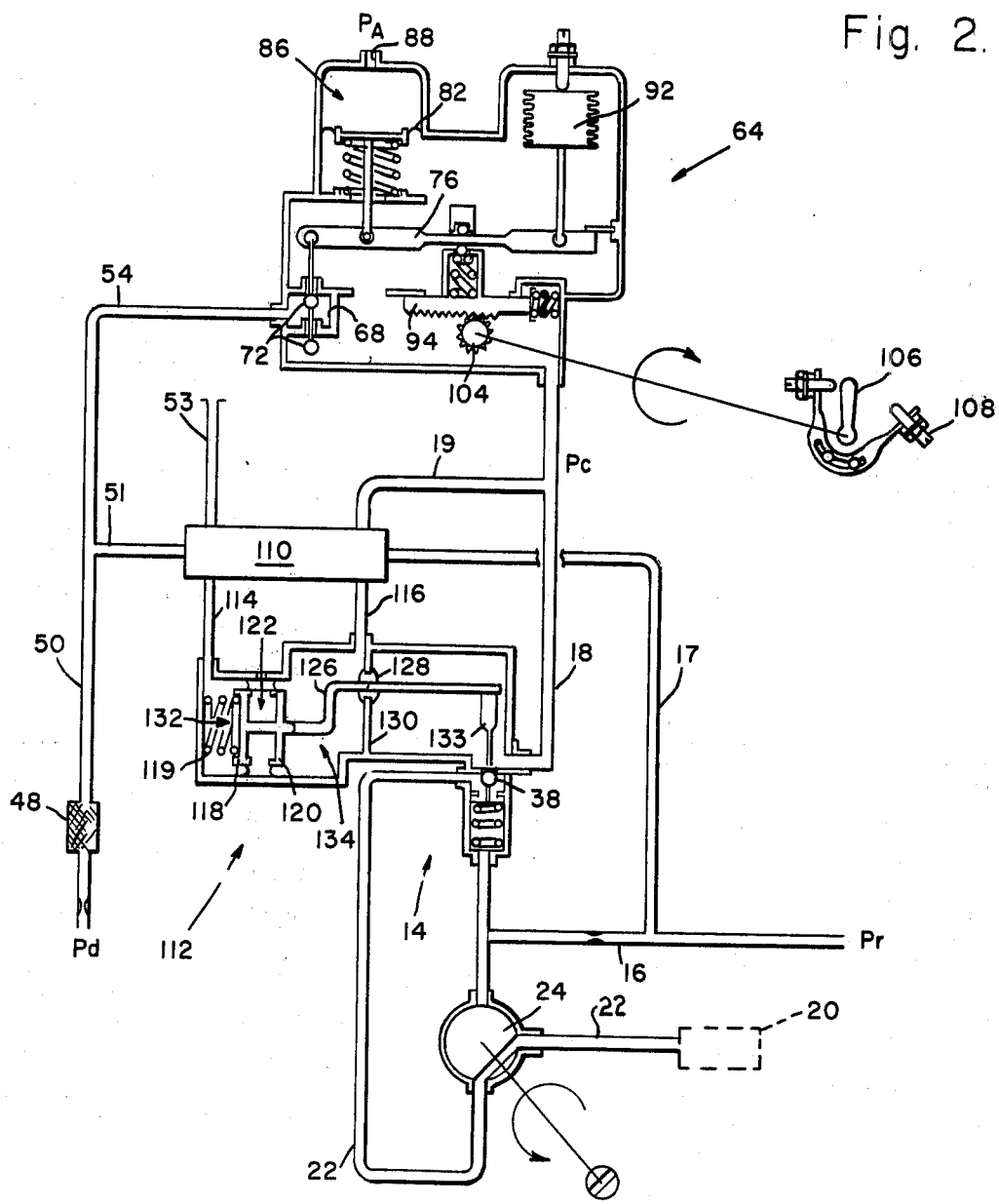
FIG. 2 comprises a schematic illustration of another embodiment of the invention.

An alternative embodiment of the invention is shown in FIG. 2, wherein components corresponding with like components of the embodiment of FIG. 1 are identified conveniently with like reference numerals. In this embodiment, the compressor discharge pressure ($P_d$) is coupled directly at all times via the conduits 50 and 54 to the pressure ratio servo 64 which is identical with the embodiment of FIG. 1, and functions to provide a predetermined control pressure ($P_c$) for application to a fuel flow regulator 20 through a switching valve 14. However, the position of the valve ball 38 of the switching valve 14 is controlled by a pressure differential switcher 112 which in turn is operated by a fluidics comparator circuit 110.

As shown in FIG. 2, the fluidics comparator circuit 110 is coupled to the ram air pressure ($P_r$) by a line 17 and to the control pressure ($P_c$) by a line 19. The comparator circuit 110 is pneumatically driven by the compressor pressure ($P_d$) via a line 51, and exhausted via a line 53. The circuit functions to fluidicly compare the magnitudes of the two pressures ($P_r$) and ($P_c$) and to provide an amplified differential output to the differential switcher 112. This amplified pressure differential output is supplied to the switcher 112 via either a line 114 or a line 116, depending upon which pressure ($P_r$ or $P_c$) comprises the lesser of the two pressures, as will be explained.

The pressure differential switcher 112 includes a pair of flexible diaphragms 118 and 120 biased by a spring 119 and separated by a vented chamber 122. The diaphragms are both connected to an actuator rod 124 which has a central offset portion 126 and extends through a sealed flexure pivot 128 in a wall 130. The opposite end of the actuator rod 124 is connected to a valve plunger 133 which functions identically to the valve plunger 33 of FIG. 1 to operably control the position of the switching valve 14.

The pressure line 114 from the fluidics comparator circuit 110 is coupled to a pressure chamber 132 on one side of the diaphragm 118, and the pressure line 116 is coupled to a pressure chamber 134 on one side of the other diaphragm 120. In operation of the control system, the comparator circuit 110 provides an amplified pressure to the pressure line 114 whenever the ram air pressure ($P_r$) is less than the control pressure ($P_c$). In this mode, pressure is applied to the diaphragm 118 to pivot the actuator rod 124 about the flexure pivot 128 to withdraw the plunger 133 from the switching valve 14. Thus, until ram air pressure ($P_r$) exceeds the control pressure ($P_c$), the control system supplies ram air pressure to the fuel flow regulator 20. However, when the ram air pressure ($P_r$) exceeds the control pressure ($P_c$), the comparator circuit 110 automatically switches to provide an amplified pressure signal via the pressure line 116 to the chamber 134 adjacent the second diaphragm 120. In this latter mode, the amplified pressure signal causes the actuator rod 124 to pivot moving the plunger 133 into operating engagement with the switching valve 14 to couple the control pressure ($P_c$) to the regulator 20.

Figure 3:
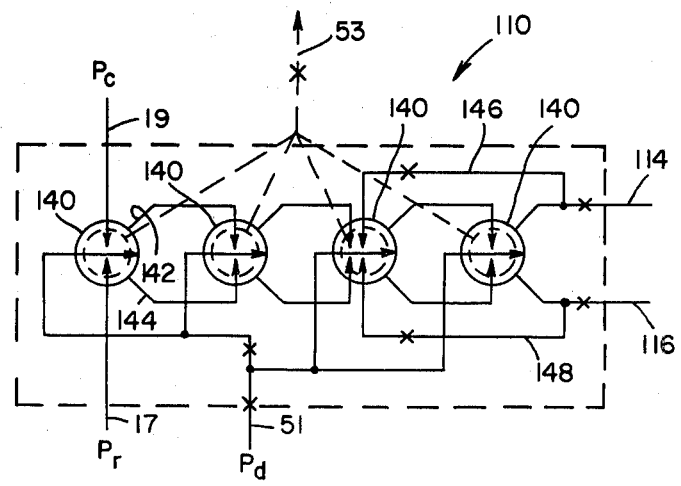
FIG. 3 comprises a schematic diagram of a fluidics comparator circuit for use in the embodiment of FIG. 2.

The fluidics comparator circuit 110 is shown in more detail in FIG. 3. As shown, the circuit 110 comprises a cascaded series of fluidics amplifiers 140 driven by the compressor pressure ($P_d$) via the conduit 51. The first amplifier 140 of the series is supplied with ram air pressure ($P_r$) and the control pressure ($P_c$) via the conduits 17 and 19, respectively, and functions to provide an amplified output on either the line 142 or 144, depending upon which pressure ($P_r$ or $P_c$) is greater in magnitude. The output is fed to the next amplifier 140 in the series for further amplification and provision of an output on one of a pair of output lines. Finally, an amplified circuit output is provided via conduit 114 to control the position of the switcher valve 14 to couple ram air pressure ($P_r$) to the regulator 20 when ram air pressure ($P_r$) is less than the control pressure. Conversely, an amplified circuit output is provided via conduit 116 to control the position of the switch valve 14 to couple the control pressure ($P_c$) to the regulator 20 when ram air pressure ($P_r$) exceeds the control pressure ($P_c$). Conveniently, feedback loops 146 and 148 are provided between the last two amplifiers in the circuit series to prevent the circuit from switching back and forth when the pressures ($P_r$ and $P_c$) are close to one another in value.

A variety of modifications and improvements in the invention are believed to be possible within the skill of the art. However, no limitation to the invention is intended by way of the foregoing description and embodiments except as set forth in the appended claims.

What is claimed is:

1. A control system for a pressure-responsive fuel flow regulator, comprising pressure calculation means for providing a predetermined output control pressure; means for providing a source of ram air pressure; valve means movable between a first position for coupling the control pressure to the regulator, and a second position for coupling the ram air pressure to the regulator for controlling regulator fuel flow; and switch means for controllably shifting said valve means between said first and second positions.

2. A control system as set forth in claim 1 wherein said valve means comprises a valve ball movable between a first seat for coupling the control pressure to the regulator and for preventing coupling of ram air pressure to the regulator, and a second seat for coupling ram air pressure to the regulator and for preventing coupling of the control pressure to the regulator, said valve means including spring means for biasing said valve ball into engagement with said first seat.

3. A control system as set forth in claim 2 wherein said switch means comprises a pneumatically actuated switcher for moving said valve ball into engagement with said second seat, and means for supplying a source of driving pressure to said switcher for actuating said switcher.

4. A control system as set forth in claim 3 wherein said switcher comprises a plunger for engaging said valve ball for moving said ball into engagement with said second seat, a diaphragm coupled to said plunger and responsive to application of the driving pressure for moving said plunger into engagement with said valve ball, and biasing means for normally biasing said diaphragm to urge said plunger out of engagement with said valve ball.

5. A control system as set forth in claim 3 including means for selectively controlling application of said driving pressure to said switcher.

6. A control system as set forth in claim 5 wherein said selective controlling means comprises a manually controlled valve.

7. A control system as set forth in claim 1 wherein said pressure calculation means comprises means for providing an output control pressure comprising a constant predetermined function of absolute ambient pressure.

8. A control system as set forth in claim 1 wherein said pressure calculation means comprises a pressure ratio servo responsive to application of a driving pressure for providing an output control pressure comprising a constant predetermined function of absolute ambient pressure.

9. A control system as set forth in claim 8 wherein said pressure ratio servo comprises means forming a pressure modulation chamber within said servo and having a pair of generally opposed valve seats, a pair of valve balls mechanically linked together for respectively closing said valve seats, a double-ended servo balance beam pivoted within said servo, a linkage arm connecting said valve balls to said balance beam, and means coupled to said beam and responsive to absolute ambient pressure for modulating the position of said valve balls with respect to said valve seats whereby the pressure within said servo comprises the control pressure, and including conduit means for coupling the control pressure to said valve means.

10. A control system as set forth in claim 9 including movable pivot means pivotally carrying said balance beam, and shiftable along the length of said balance beam for controllably adjusting the magnitude of the control pressure.

11. A control system as set forth in claim 9 wherein said means coupled to said beam and responsive to absolute ambient pressure comprises a spring-biased diaphragm assembly coupled generally to one end of said beam and including means for applying ambient pressure to said diaphragm, and an evacuated spring-bellows assembly coupled generally to the other end of said beam for adjusting the position of the beam in response to absolute pressure.

12. A control system as set forth in claim 1 wherein said switch means comprises a fluidics comparator circuit for comparing the magnitudes of the control pressure and ram air pressure, and for providing a fluidics signal output on one of a pair of output conduits depending upon which of the control pressure, and ram air pressure is lesser in magnitude, and including means responsive to the fluidics signal output for shifting said valve means to said first position when the control pressure is lesser in magnitude, and for shifting said valve means to said second position when the ram air pressure is lesser in magnitude.

13. A control system for a pressure-responsive fuel flow regulator, comprising means for providing a source of driving pressure; a pressure ratio servo responsive to application of the driving pressure for adjusting the pressure level thereof to provide an output control pressure comprising a constant predetermined function of absolute ambient pressure; means for providing a source of ram air pressure; valve means movable between a first position for coupling the control pressure to the regulator, and a second position for coupling the ram air pressure to the regulator for controlling regulator fuel flow; and switch means for controllably shifting said valve means between said first and second positions.

14. A control system as set forth in claim 13 wherein said pressure ratio servo comprises means forming a pressure modulation chamber within said servo and having a pair of generally opposed valve seats, a pair of valve balls mechanically linked together for respectively closing said valve seats, a double-ended servo balance beam pivoted within said servo, a linkage arm connecting said valve balls to said balance beam, and means coupled to said beam and responsive to absolute ambient pressure for modulating the position of said valve balls with respect to said valve seat whereby the pressure within said servo comprises the control pressure, and including conduit means for coupling the control pressure to said valve means.

15. A control system as set forth in claim 14 including movable pivot means pivotally carrying said balance beam, and shiftable along the length of said balance beam for controllably adjusting the magnitude of the control pressure.

16. A control system as set forth in claim 14 wherein said means coupled to said beam and responsive to absolute ambient pressure comprises a spring-biased diaphragm assembly coupled generally to one end of said beam and including means for applying ambient pressure to said diaphragm, and an evacuated spring-bellows assembly coupled generally to the other end of said beam for adjusting the position of the beam in response to absolute pressure.

17. A control system as set forth in claim 13 wherein said switch means comprises a pneumatically actuated switcher for controllably operating said valve means, and including means for selectively supplying the driving pressure to said switcher for actuating said switcher.

18. A control system as set forth in claim 13 wherein said switch means comprises a fluidics comparator circuit for comparing the magnitudes of the control pressure and ram air pressure, and for providing a fluidics signal output on one of a pair of output conduits depending upon which of the control pressure and ram air pressure is lesser in magnitude, and including means responsive to the fluidics signal output for shifting said valve means to said first position when the control pressure is lesser in magnitude, and for shifting said valve means to said second position when the ram air pressure is lesser in magnitude.

19. A control system for a pressure-responsive fuel flow regulator, comprising means for providing a source of driving pressure; a pressure ratio servo responsive to application of the driving pressure for adjusting the pressure level thereof to provide an output control pressure comprising a constant predetermined function of absolute ambient pressure, said servo including means forming a pressure modulation chamber within said servo and having a pair of generally opposed valve seats, a pair of valve balls mechanically linked together for respectively closing said valve seats, a double-ended servo balance beam pivoted within said servo, a linkage arm connecting said valve balls to said balance beam, and means coupled to said beam and responsive to absolute ambient pressure for modulating the position of said valve balls with respect to said valve seats whereby the pressure within said servo comprises the control pressure; means for providing a source of ram air pressure; valve means movable between a first position for coupling the control pressure to the regulator, and a second position for coupling the ram air pressure to the regulator for controlling regulator fuel flow; and switch means for controllably shifting said valve means between said first and second positions.

20. A control system as set forth in claim 19 including movable pivot means pivotally carrying said balance beam, and shiftable along the length of said balance beam for controllably adjusting the magnitude of the control pressure.

21. A control system as set forth in claim 19 wherein said means coupled to said beam and responsive to absolute ambient pressure comprises a spring-biased diaphragm assembly coupled generally to one end of said beam and including means for applying ambient pressure to said diaphragm, and an evacuated spring-bellows assembly coupled generally to the other end of said beam for adjusting the position of the beam in response to absolute pressure.

22. A control system as set forth in claim 19 wherein said switch means comprises a pneumatically actuated switcher for controllably operating said valve means, and including means for selectively supplying the driving pressure to said switcher for actuating said switcher.

23. A control system as set forth in claim 19 wherein said switch means comprises a fluidics comparator circuit for comparing the magnitudes of the control pressure and ram air pressure, and for providing a fluidics signal output on one of a pair of output conduits depending upon which of the control pressure and ram air pressure is lesser in magnitude, and including means responsive to the fluidics signal output for shifting said valve means to said first position when the control pressure is lesser in magnitude, and for shifting said valve means to said second position when the ram air pressure is lesser in magnitude.

24. A control system for a pressure-responsive fuel flow regulator, comprising means for providing a source of driving pressure; a pressure ratio servo responsive to application of the driving pressure for adjusting the pressure level thereof to provide an output control pressure comprising a constant predetermined function of absolute ambient pressure, said servo including means forming a pressure modulation chamber within said servo and having a pair of generally opposed valve seats, a pair of valve balls mechanically linked together for respectively closing said valve seats, a double-ended servo balance beam pivoted within said servo, movable pivot means pivotally carrying said balance beam, a linkage arm connecting said balance beam with said valve balls, a spring-biased diaphragm assembly coupled generally to one end of said beam and including means for applying ambient pressure to said diaphragm, an evacuated spring-bellows assembly coupled generally to the other end of said beam for adjusting the position of the beam in response to absolute pressure, whereby the position of said beam is adjusted for modulating the position of said valve balls so that the pressure within said servo comprises the control pressure; means for providing a source of ram air pressure; valve means movable between a first position for coupling the control pressure to the regulator, and a second position for coupling the ram air pressure to the regulator for controlling regulator fuel flow; and switch means for controllably shifting said valve means between said first and second positions.

25. A method of controlling a pressure-responsive fuel flow regulator, comprising the steps of supplying a source of driving pressure to a pressure ratio servo; altering the pressure level of the driving pressure within said servo to provide an output control pressure comprising a predetermined function of absolute ambient pressure; providing a source of ram air pressure, coupling the control pressure and the ram air pressure to valve means; and controllably switching the valve means between a first position for coupling the control pressure to the regulator, and a second position for coupling the ram air pressure to the regulator for controlling regulator fuel flow.

26. The method of claim 25 including pneumatically switching the valve means with a pneumatically actuated switcher, and selectively applying the driving pressure to the switcher for actuating the switcher.

27. The method of claim 25 including comparing the magnitudes of the control pressure and the ram air pressure with a fluidics comparator circuit, and supplying a fluidics signal output to switch means for switching the valve means to the first position when the control pressure is lesser in magnitude, and for switching the valve means to the second position when the ram air pressure is lesser in magnitude.

28. The method of claim 25 wherein said pressure altering step comprises supplying the driving pressure to a pressure modulation chamber within the servo having a pair of generally opposed valve ports and a pair of valve balls linked together for respectively closing the ports, connecting the valve balls to a double-ended servo balance beam pivotally carried within the servo, and connecting the beam to means responsive to absolute ambient air pressure for modulating the position of the valve balls whereby the pressure within the servo comprises the control pressure.

29. The method of claim 28 including the step of mounting the balance beam on movable pivot means to allow adjustment of the magnitude of the control pressure.

30. The method of claim 28 wherein said step of connecting the beam to means responsive to absolute ambient pressure comprises connecting one end of the beam to a spring-biased diaphragm assembly and applying ambient pressure to the diaphragm, and connecting the other end of the beam to an evacuated spring-bellows assembly for adjusting the position of the beam in accordance with absolute pressure.

31. A method of controlling a pressure-responsive fuel flow regulator, comprising the steps of supplying a source of driving pressure to a pressure ratio servo;

altering the pressure level of the driving pressure within said servo to provide an output control pressure comprising a predetermined function of absolute ambient pressure; said altering step including supplying the driving pressure to a pressure modulation chamber within the servo having a pair of generally opposed valve ports and a pair of valve balls linked together for respectively closing the ports, connecting the valve balls to a double-ended servo balance beam pivotally carried within the servo, and connecting the beam to means responsive to absolute ambient air pressure for modulating the position of the valve balls whereby the pressure within the servo comprises the control pressure, providing a source of ram air pressure; coupling the control pressure and the ram air pressure to valve means; and controllably switching the valve means between a first position for coupling the control pressure to the regulator, and a second position for coupling the ram air pressure to the regulator for controlling regulator fuel flow.

32. The method of claim 31 including pneumatically switching the valve means with a pneumatically actuated switcher, and selectively applying the driving pressure to the switcher for actuating the switcher.

33. The method of claim 31 including comparing the magnitudes of the control pressure and the ram air pressure with a fluidics comparator circuit, and supplying a fluidics signal output to switch means for switching the valve means to the first position when the control pressure is lesser in magnitude, and for switching the valve means to the second position when the ram air pressure is lesser in magnitude.

34. The method of claim 31 including the step of mounting the balance beam on movable pivot means to allow adjustment of the magnitude of the control pressure.

35. The method of claim 31 wherein said step of connecting the beam to means responsive to absolute ambient pressure comprises connecting one end of the beam to a spring-biased diaphragm assembly and applying ambient pressure to the diaphragm, and connecting the other end of the beam to an evacuated spring-bellows assembly for adjusting the position of the beam in accordance with absolute pressure.

* * * * *